United States Patent [19]
Hammond

[11] Patent Number: 6,148,321
[45] Date of Patent: *Nov. 14, 2000

[54] PROCESSOR EVENT RECOGNITION

[75] Inventor: Gary N. Hammond, Campbell, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,118

[22] Filed: Apr. 17, 1997

Related U.S. Application Data

[63] Continuation of application No. 08/435,389, May 5, 1995, abandoned.

[51] Int. Cl.$^7$ .................................................... G06F 9/00
[52] U.S. Cl. .................................... 709/100; 709/318
[58] Field of Search ........................... 395/742, 739, 395/734, 733, 678, 670–677; 710/269, 266, 261, 260; 709/108, 100, 102, 107, 318

[56] References Cited

U.S. PATENT DOCUMENTS

| | | | |
|---|---|---|---|
| 4,768,149 | 8/1988 | Konopik et al. | 364/200 |
| 5,291,603 | 3/1994 | Morse et al. | 395/725 |
| 5,299,260 | 3/1994 | Shaio | 379/265 |
| 5,315,711 | 5/1994 | Barone et al. | 395/275 |
| 5,355,490 | 10/1994 | Kou | 395/700 |
| 5,394,544 | 2/1995 | Motoyama et al. | 395/575 |
| 5,428,799 | 6/1995 | Woods et al. | 395/725 |
| 5,594,905 | 1/1997 | Mital | 395/733 |
| 5,630,141 | 5/1997 | Ross et al. | 395/734 |
| 5,734,910 | 3/1998 | Corrigan et al. | 395/734 |
| 5,734,911 | 3/1998 | Lai | 395/742 |

OTHER PUBLICATIONS

"Advanced MS DOS Programming" Microsoft Press Published 1986.
i486™ *Microprocessor Programmer's Reference Manual*, Intel Corporation (1990), Ch. 4 and Ch. 9.
Pentium™ *Family User's Manual, vol. 1: Data Book*, Intel Corporation (1994), Ch. 12.
Kane, Gary. *MIPS R2000 RISC Architecture*, MIPS Computer Systems, 1987, pp. 1–1–1–17, 5–1–5–26.
Kane, Gerry and Joe Heinrich. MIPS RISC Architecture, MIPS Computer Systems, 1992, pp. 6–1–6–45.

*Primary Examiner*—Majid A. Banankhah
*Assistant Examiner*—Sue Lao
*Attorney, Agent, or Firm*—Blakely, Sokoloff, Taylor & Zafman LLP

[57] ABSTRACT

A method and apparatus for the incorporation of additional processor generated events. The processor generally comprises a storage area, an indication unit, and a retriever. The storage area stores an indication. Upon recognition of each event, the indication unit alters the state of the indication—i.e., if an event is generated by the processor, the indication unit alters the state of the indication to a first state; and if an event is not generated by the processor, the indication unit alters the state of the indication to a second state. The retriever retrieves, in response to delivery of either a first processor generated event or a second non-processor generated event, a pointer which identifies a corresponding selector. This selector causes the processor to execute either a first number of instructions corresponding to the processor generated event or a second number of instructions corresponding to the non-processor generated event based on the indication.

17 Claims, 3 Drawing Sheets

PROCESSOR EVENT RECOGNITION

This is a continuation of application Ser. No. 08/435,389, filed May 5, 1995, now abandoned.

BACKGROUND OF THE INVENTION

1. Field of the Invention

The present invention relates to the field of computer architecture, specifically to the field of event handling.

2. Description of Related Art

An event is any action or occurrence to which a computer system might respond, including what are commonly referred to as interrupts. An event may be either a processor or system generated event. Processor generated events (also commonly referred to as internal interrupts) are generated by the processor in response to certain predefined situations, division by zero for example. System generated events are generated by software (also commonly referred to as software interrupts) and by hardware that is external to the processor (also commonly referred to as external interrupts). A common system generated event is a request from a peripheral device for service. Upon recognition of an event, the processor of a computer system temporarily suspends the execution of the current process, saves the status of its work, and executes the appropriate handler to "handle" or "service" the event. Upon completion of the appropriate handler, the processor resumes the execution of the suspended process.

Interrupt Descriptor Table

To determine the starting address of the appropriate handler to execute in response to an event, an interrupt descriptor table (also termed an interrupt vector table) is commonly used. Various references describe the use and advantages of event handling using interrupt descriptor tables: Shanley, Tom and Anderson, Don, *IS A System Architecture*, published by MindShare, Inc., 1993 and hereinafter referred to as the Shanley reference; Jourdain, Robert, *Programmer's Problem Solver for the IBM PC, XT, & AT*, published by Brady Communications Company, Inc., 1986. As described in Shanley, the interrupt descriptor table is normally stored in a computer system's Random Access Memory (RAM) and contains the address of the corresponding handler for each interrupt. The addresses stored in an interrupt descriptor table are commonly referred to as pointers, vectors or descriptors. Upon the occurrence of an event, the processor determines which entry in the interrupt descriptor table corresponds to the event, accesses the pointer stored in that entry, and executes the handler to which that pointer points. In this manner, an interrupt is linked to a corresponding handler through an entry in the interrupt descriptor table.

Generally, certain entries in the interrupt descriptor table are used for processor generated events, while the remaining entries are utilized for system generated events. To provide an example, assuming 256 entries are available and entries 0–31 are used for processor generated events, the remaining entries 32–255 are available for system generated events. Furthermore, the same processor generated events are consistently assigned to the same entries so that products developed for previous processors are compatible with future processors.

It is now desirable to incorporate additional processor generated events that require additional entries. However, a problem lies in that the existing entries currently being used for processor generated events are still required and the remaining entries are potentially being employed for system generated events. If both a processor generated event and a system generated event share the same entry, the entry will be "over-loaded" (i.e. an entry can contain only one pointer, but the processor and system event handlers are located at different starting addresses). On the other hand, if the traditional entry assignments are altered to make entries available for new processor generated events, existing products may not be compatible.

SUMMARY OF THE INVENTION

A method for the incorporation of additional processor generated events is provided. According to one aspect of the invention, an indication is stored in a storage area on a processor in response to delivery of a current event. This indication is stored to indicate whether the current event is a first event that is generated by the processor or a second event that is not generated by the processor. Then, a first pointer which corresponds to the first and second events is accessed. This first pointer is used to access a selector. This selector causes the processor to either execute a first number of instructions corresponding to the first event if the indication indicates the current event is the first event or causes the processor to execute a second number of instructions corresponding to the second event if the indication indicates the current event is the second event. According to another embodiment of the invention, the selector is implemented in software.

According to another aspect of the present invention, an apparatus for the incorporation of additional processor generated events is provided. The processor generally comprises a storage area, an indication unit, and a retriever. The storage area stores an indication. Upon recognition of each event, the indication unit alters the state of the indication—i.e., if an event is generated by the processor, the indication unit alters the state of the indication to a first state; and if an event is not generated by the processor, the indication unit alters the state of the indication to a second state. The retriever retrieves, in response to delivery of either a first processor generated event or a second non-processor generated event, a pointer which identifies a corresponding selector. This selector causes the processor to execute either a first number of instructions corresponding to the processor generated event or a second number of instructions corresponding to the non-processor generated event based on the indication.

BRIEF DESCRIPTION OF DRAWINGS

The invention may best be understood by referring to the following description and accompanying drawings which illustrate the invention. In the drawings.

DETAILED DESCRIPTION OF THE PREFERRED EMBODIMENT

In the following description, numerous specific details are set forth to provide a thorough understanding of the present invention. However, it is understood that the present invention may be practiced without these specific details. In other instances, well-known circuits, structures and techniques have not been shown in detail in order not to obscure the present invention.

Although a more detailed explanation will be provided below, it is thought worthwhile to first provide a brief overview of the present invention. This application describes a method and apparatus for the incorporation of additional processor generated events while maintaining compatibility with existing products. To accomplish this, the present invention allows each entry of the interrupt descriptor table to be assigned both processor generated events and system generated events. In one embodiment, when an event is received, an event indication is stored to indicate whether the event is a processor generated event or a system generated event, and then the appropriate entry in the interrupt descriptor table is accessed. The interrupt descriptor table entries which are overloaded (i.e., correspond to a processor generated event and a system generated event) store a pointer to a corresponding selector. Each selector causes the processor to selectively execute either a set of instructions which services the corresponding processor generated event or a set of instructions which services the corresponding system generated event based on the state of the event indication. In one embodiment, the selectors are implemented in software—e.g., each pointer points to a routine or instruction in memory which causes the processor to branch to the appropriate set of instructions based on the state of the event indication.

One Embodiment of the Present Invention

Figure 1:
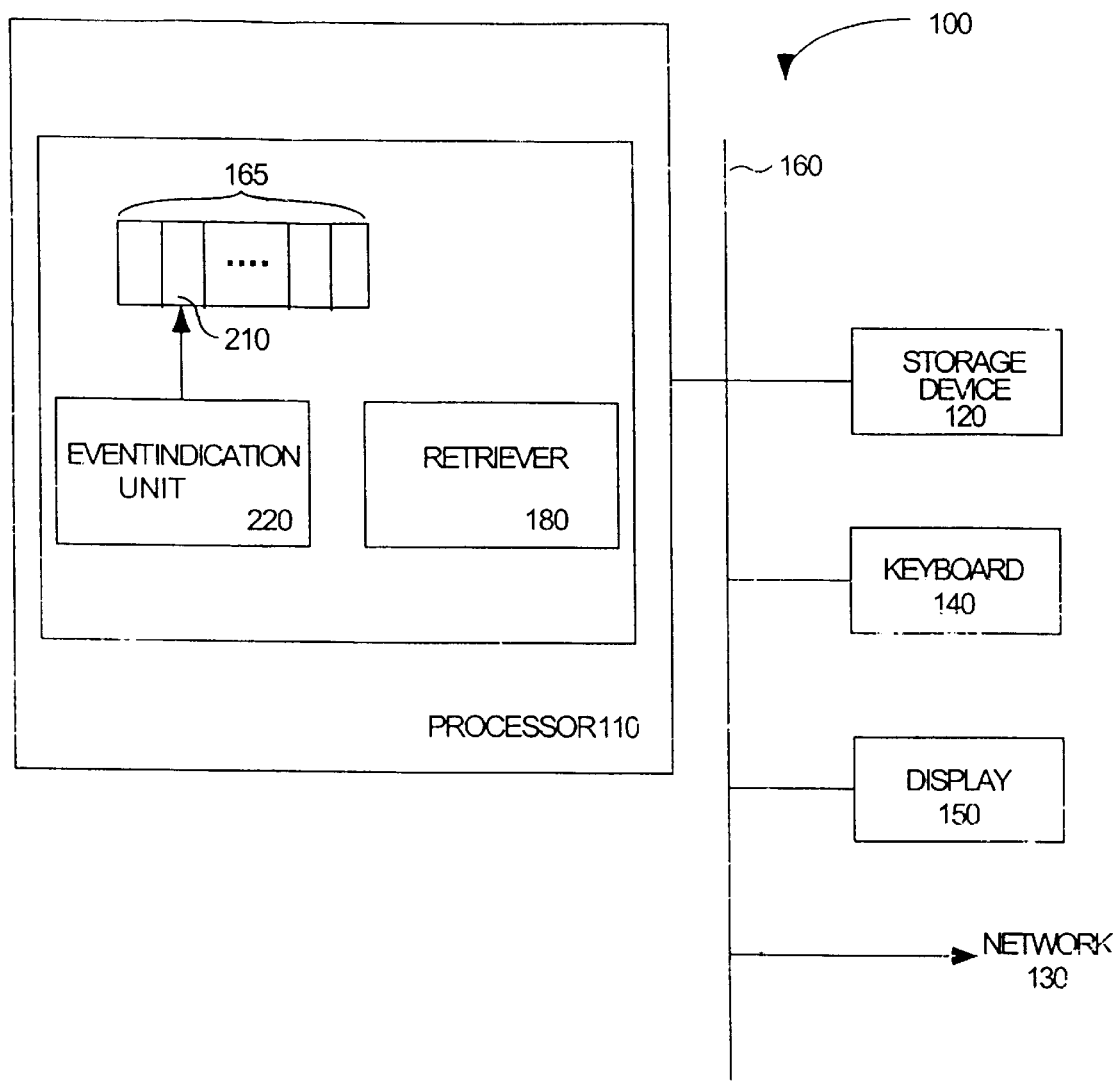
FIG. 1 illustrates an exemplary computer system incorporating the teachings of the present invention.

Referring now to FIG. 1, a block diagram illustrating an exemplary computer system 100 incorporating the teachings of the present invention is shown. The exemplary computer system comprises a processor 110, a storage device 120, a network 130, and a bus 160. Processor 110 is coupled to storage device 120 and network 130 by bus 160. In addition, a number of user input/output devices, such as a keyboard 140 and a display 150, are also coupled to bus 160. Processor 110 represents a central processing unit of any type of architecture, including a CISC or RISC architecture. Storage device 120 represents one or more mechanisms for storing data. For example, storage device 120 may include read only memory (ROM), random access memory (RAM), and/or a magnetic disk storage medium. While computer system 100 is shown containing a single processor, the present invention could be utilized in a multi processor system.

FIG. 1 also illustrates that processor 110 comprises an a register 165, event indication unit 220, and a retriever 180. Of course, processor 110 contains additional circuitry which is not shown so as to not obscure the present invention. Register 165 is shown to contain an event bit 210 (also referred to herein as the event indication) to indicate whether an event is a processor generated event or a system generated event While one embodiment is described in which a bit in a register is used to indicate whether an event is a processor or system generated event, alternative embodiments could use any number of techniques. For example, the event indication could be stored off chip (e.g., in storage device 120), and/or the event indication could be made up of multiple bits.

Event indication unit 220 is used to alter the state of event bit 210 in response to processor 110 receiving an event. While event indication unit 220 is conceptually shown as a block in FIG. 1 for convenience sake, in one embodiment event indication unit 220 is implemented using microcode. Upon delivery of each event, processor 110 executes a microcode sequence corresponding to the delivered event. The microcode sequences corresponding to processor generated events alter the event indication to indicate the delivered event is a processor generated event. In contrast, the microcode sequences corresponding to system generated events alter the event indication to indicate the delivered event is a system generated event. While one embodiment of the present invention is described in which event indication unit 220 is implemented using microcode, alternative embodiments could use any number of techniques. For example, event indication unit 220 could be implemented using circuitry.

Retriever 180 is used for accessing the interrupt descriptor table. While retriever 180 is conceptually shown as a block in FIG. 1 for convenience sake, in one embodiment retriever 180 is implemented using microcode. Each microcode sequence comprising event indication unit 220 concludes in a jump to a common microcode sequence (i.e., retriever 180—also termed as the "microcode interrupt funnel") which accesses the interrupt descriptor table. While one embodiment of the present invention is described in which retriever 180 is implemented using microcode, alternative embodiments could use any number of techniques. For example, retriever 180 could be implemented using circuitry.

For explanatory purposes, an embodiment will be described with reference to FIG. 2 in which a single entry in the interrupt vector table is shared by a processor and a system generated event. However, it is understood that any number of entries could be used in this manner.

Figure 2:
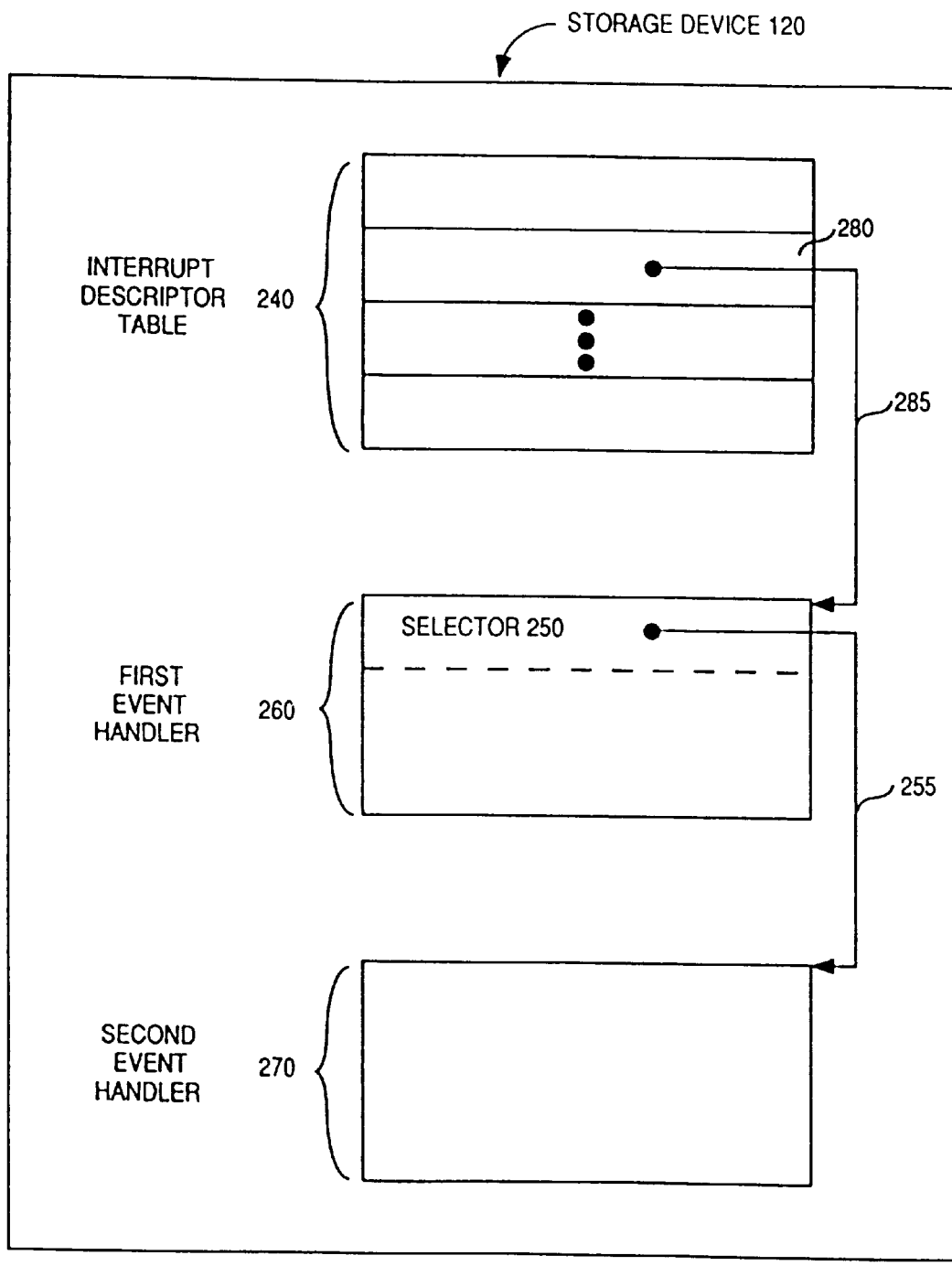
FIG. 2 illustrates an example of the information, stored in the storage device shown in FIG. 1, for servicing events according to one embodiment of the present invention.

FIG. 2 illustrates an example of the information, stored in the storage device shown in FIG. 1, for servicing events according to one embodiment of the present invention. FIG. 2 shows storage device 120 containing an interrupt descriptor table 240, a first event handler 260, and a second event handler 270. Interrupt descriptor table 240 is shown containing a number of entries including entry 280. Entry 280 is shown containing pointer 285 which identifies the location in storage device 120 of first event handler 260. Thus, upon delivery of either a processor or a system generated event corresponding to entry 280, retriever 180 uses pointer 285 to cause processor 110 to execute first event handler 260. First event handler 260 is used for handling the processor generated event, while second event handler 270 is used for handling the system generated event. In one embodiment, a selector 250 is the first instruction in first event handler 260. When executed, this instruction causes the processor to check the event indication and to branch to second event handler 270 (using a pointer 255) if the event indication indicates the delivered event is a system generated event. However, if the event indication indicates the delivered event is a processor generated event, the processor continues execution of first event handler 260.

While one embodiment is described in which first event handler 260 handles the processor generated event, it is understood that first event handler 260 could be used for handling the system generated event and second event handler 270 could be for handling the processor generated event. In addition, while one embodiment is described in which selector 250 is part of first event handler 260, it is understood that selector 250 could be implemented as a separate routine containing pointers to both first event handler 260 and second event handler 270. Furthermore, while one embodiment is described in which selector 250 is implemented as one or more instructions, alternative embodiments could implement selector 250 in any number of ways, including using microcode and/or circuitry.

Having described the basic elements of one embodiment of the present invention, the operation of the event handling mechanism of computer system 100 according to one embodiment of the present invention will now be described with reference to FIG. 3.

Figure 3:
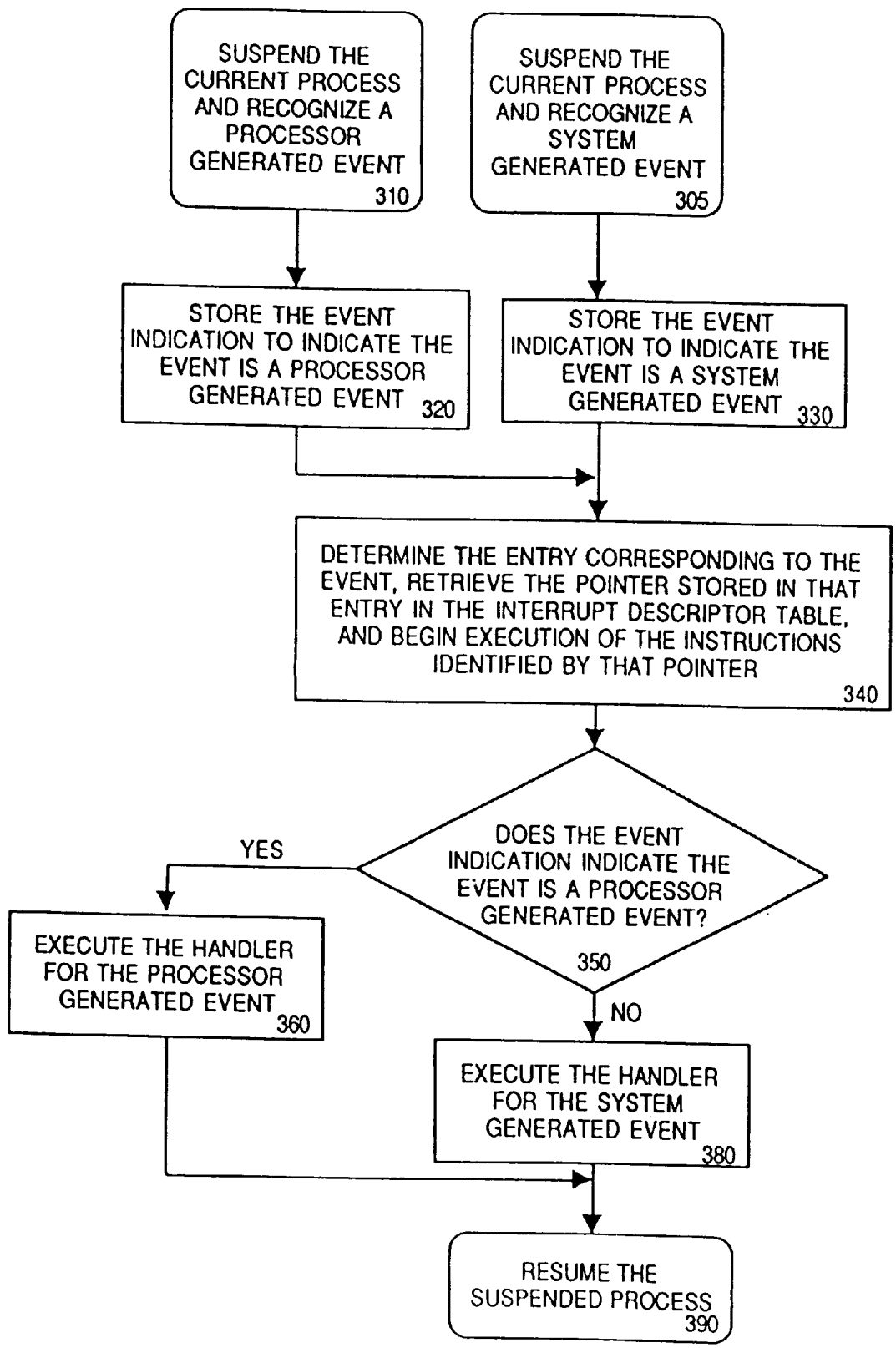
FIG. 3 is a flow diagram illustrating the operation of an event handling mechanism according to one embodiment of the present invention.

FIG. 3 shows a flow diagram illustrating the operation of an event handling mechanism according to one embodiment of the invention. The flow diagram in FIG. 3 can start at either block 305 or 310;—i.e., if a processor generated event occurs, flow starts at block 305; if a system generated event occurs, flow starts at block 310.

As shown in block 305, processor 110 suspends execution of the current process and recognizes a system generated event in response to receiving the system generated event. From block 305, flow passes to block 330.

As shown in block 330, the event indication is stored to indicate the recognized event is a system generated event and flow passes to step 340. In one embodiment, this step is performed by event indication unit 220 altering the state of event bit 210 to indicate the current event is a system generated event as previously described.

In contrast, block 310 shows processor 110 suspends execution of the current process and recognizes a processor generated event in response to receiving the processor generated event. From block 310, flow passes to block 320.

As shown in block 320, the event indication is stored to indicate the current event is a processor generated event and flow passes to step 340. In one embodiment, this step is performed by event indication unit 220 altering the state of event bit 210 to indicate the current event is a processor generated event as previously described.

At step 340, the location of the entry in the interrupt descriptor table which corresponds to the current event is determined, the pointer stored in that entry is retrieved, and the instructions stored starting at that pointer are executed. From step 340, flow passes to block 350. In one embodiment, step 340 is performed by the microcode interrupt funnel executing on processor 110. To provide an example, if the recognized event is either the processor or system generated event corresponding to entry 330, the microcode interrupt funnel executing on processor 110 determines the location of entry 330 in storage device 120, retrieves pointer 310 from entry 330, and causes processor 110 to execute first event handler 260.

At step 350, the determination is made whether the event indication indicates the current event is a processor generated event. If the current event is a processor generated event, flow passes to step 360. Otherwise, flow passes to step 380. In the present example, selector 250 (i.e., the first instruction of first event handler 260) causes processor 110 to branch to second event handler 270 using pointer 320 if the state of event bit 210 indicates the current event is a system generated event.

At step 360, the event handler for the processor generated event is executed. From step 360, flow passes to step 390. In the present example, selector 250 does not cause processor 110 to branch to second event handler 270, but allows processor 110 to continue executing first event handler 260 to service the current event. In this manner, if a processor generated event occurs, first event handler 260 is executed.

At step 380, the event handler for the system generated event is executed. From step 380, flow passes to step 390. In this manner, if a system generated event occurs, second event handler 270 is executed.

As shown in step 390, the flow diagram ends and the event handling mechanism causes the processor to return to the interrupted processing.

In this manner, the distinction between processor and system generated events is made transparent to the operation of the interrupt descriptor table. As a result, the present invention provides for compatibility with existing products by maintaining the traditional interrupt descriptor table assignments while allowing for the incorporation of additional processor generated events.

Alternative Embodiments

While one embodiment is described with reference to the incorporation of additional processor generated events, alternative embodiments could allow events with different handlers to share entries by storing some indication to indicate which of the corresponding handlers should be executed prior to accessing the interrupt descriptor table. Furthermore, while one embodiment is described in which one entry is shared by two types of events, alternative embodiments could allow for the sharing of an entry by more than two types of events by incorporating additional event indications.

While the present invention has been described in terms of several embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A processor configured to recognize and process both processor generated events and non-processor generated events comprising:

an event descriptor table containing entries to handle an interrupt associated with processor and non-processor generated events in which an entry is overloaded to handle both processor and non-processor generated events;

a first event handler for handling either the processor generated event or the non-processor generated event;

a second event handler for handling the other of the processor or non-processor generated event not handled by said first event handler;

a storage area having stored therein an indication as to whether an event is a processor generated event or a non-processor generated event;

an indication unit coupled to said storage area for altering the state of the indication to indicate if the event is the processor generated event or the non-processor generated event; and a retriever coupled to retrieve a corresponding entry in said first event handler pointed to by an entry in said event descriptor table when an interrupt is received, said first event handler providing a routine for processing the interrupt if the indication indicates that the processor or non-processor generated event is an event type handled by said first event handler, but providing a pointer to an entry in said second event handler for a routine for processing the interrupt, if the event is an event-type not handled by said first event handler.

2. The processor of claim 1, wherein said event descriptor table is an interrupt vector table, in which the entry is overloaded to process both processor and non-processor generated interrupts, but in which a single vector is present to respond to the event.

3. The processor of claim 2 wherein said retriever retrieves a pointer from the entry in said interrupt vector table which pointer points to a selector in said first handler, said selector responding to the indication to execute instructions in one or the other of said handlers based on said indication.

4. The processor of claim 3 wherein said selector comprises an instruction, which is stored in a storage device coupled to said processor.

5. The processor of claim 3 wherein at least one of said indication unit and said retriever comprises a microcode instruction for execution on said processor.

6. A computer system comprising:
   a storage device having stored therein:
      an event descriptor table containing entries to handle an interrupt associated with processor and non-processor generated events in which an entry is overloaded to handle both processor and non-processor generated events;
      a first event handler for handling the processor generated event;
      a second event handler for handling the non-processor generated event;
   a processor coupled to said storage device, said processor including:
      an indication unit for altering the state of an indication to indicate if the event is a processor generated event type or a non-processor generated event type; and
      a retriever coupled to retrieve a corresponding entry in one of said event handlers pointed to by an entry in said event descriptor table when an interrupt is received, the pointed to event handler providing a routine for processing the interrupt if the indication indicates that the event type is handled by the pointed to event handler, otherwise providing another pointer to an entry in the other event handler for a routine for processing the interrupt, if the event is the other event-type not handled by the initially pointed to event handler.

7. The computer system of claim 6 wherein the initially pointed to event handler includes a branching instruction to the other event handler if the event type is not handled by the initially pointed to event handler.

8. The computer system of claim 6 wherein said indication is a bit stored in a register.

9. The computer system of claim 6 wherein one of said indication unit and said retriever comprises a microcode instruction for execution on said processor.

10. The computer system of claim 9, wherein the non-processor generated event includes software interrupts and interrupts initiated by hardware coupled to said processor.

11. The computer system of claim 9 wherein said first event handler includes first plurality of instructions to process processor generated events and said second event handler includes second plurality of instructions to process non-processor generated events.

12. In a computer system, a method for servicing events comprising:
   receiving a first event that is either a processor generated event or a system generated event;
   storing in response to delivery of said processor or system generated event an indication indicating whether said delivered event is said processor generated event or said system generated event;
   accessing a pointer which corresponds to said event, wherein said pointer identifies a selector in a first event handler, said pointer being overloaded for responding to different event types, but unable to differentiate between said processor generated event and system generated event; and
   accessing said selector in the first event handler pointed to by said pointer, said selector causing said processor to determine whether said event is said processor generated event or said system generated event based on said indication;
   if said event is said processor generated event, then executing a first instruction corresponding to said processor generated event, and
   if said event is said system generated event, then executing a second instruction corresponding to said system generated event, in which one of the first or second instruction causes a branch to a second event handler.

13. The method of claim 12, wherein said accessing said pointer further comprises:
   determining which entry in an interrupt descriptor table corresponds to said event; and
   accessing said pointer from said interrupt descriptor table.

14. The method of claim 12, wherein said accessing said selector further comprises executing on said processor a set of instructions starting at a location identified by said first pointer.

15. In a computer system that includes a processor which receives first events generated by the processor and handles them by executing a first event handler and second events not generated by the processor and handles them by executing a second event handler, a storage device which stores an event descriptor table and the first and second event handlers, wherein the event handlers are accessed via a corresponding unique entry in the event descriptor table, the improvement comprising:
   an event indication which indicates whether a current event is one of said first events or one of said second events;
   a selector, stored in the storage device in one of the event handlers, for responding to the event indication and for branching to one of the event handlers;
   the unique entry in the event descriptor table points to said selector in response to either type of events, said selector allowing the event handler to handle an interrupt associated with the event if the event handler is of a corresponding event type, otherwise branching to an entry in the other event handler for handling of the other event type.

16. The processor of claim 1, wherein the non-processor generated event includes software interrupts and interrupts initiated by hardware coupled to said processor.

17. A method for altering data stored in a storage area to overload entries in an interrupt vector table, said method comprising:
   recognizing a plurality of different event types, wherein a event is mapped to an entry in an interrupt vector table, in which the entry includes an over-loaded pointer to process a processor generated event and a non-processor generated event; and
   altering the data to indicate whether the event is the processor generated event or the non-processor generated event;
   accessing the pointer to point to a selector;
   accessing the selector to map the event to a first event handler;
   accessing data in the first event handler and if the data indicates that the event is the processor generated event, then executing instructions present in the first handler to handle the processor generated event, otherwise branching to a second event handler pointed to by a pointer in the first handler to handle the non-processor generated event.

* * * * *

UNITED STATES PATENT AND TRADEMARK OFFICE
CERTIFICATE OF CORRECTION

PATENT NO. : 6,148,321
DATED : November 14, 2000
INVENTOR(S) : Hammond

It is certified that error appears in the above-identified patent and that said Letters Patent is hereby corrected as shown below:

Column 3,
Lines 46-47, delete "comprises an a register 165, event" and insert
-- comprises a register 165, an event --.

Signed and Sealed this

Fourth Day of June, 2002

*Attest:*

*Attesting Officer*

JAMES E. ROGAN
*Director of the United States Patent and Trademark Office*